Dec. 1, 1942.    W. R. HARDING ET AL    2,303,457
SERIES SPEED-CONTROL UNITS
Filed Oct. 19, 1940      4 Sheets—Sheet 1

INVENTORS
William R. Harding &
Scott H. Hanville.
BY
Paul E. Friedemann
ATTORNEY Dec. 1, 1942. W. R. HARDING ET AL 2,303,457
SERIES SPEED-CONTROL UNITS
Filed Oct. 19, 1940 4 Sheets-Sheet 2
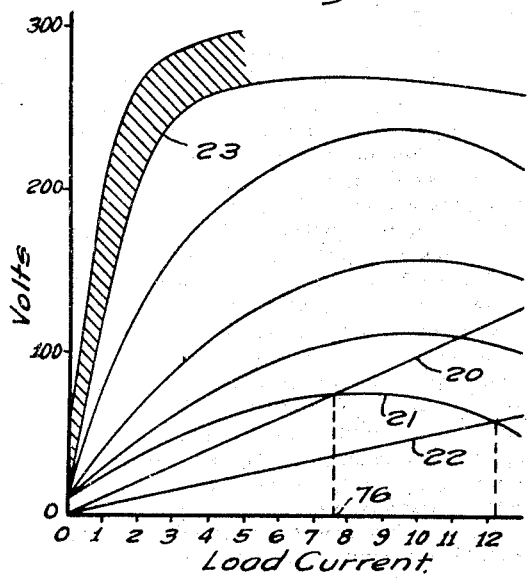
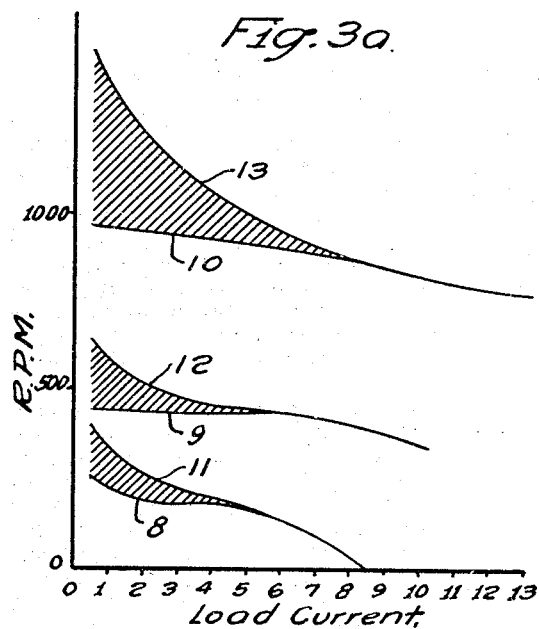
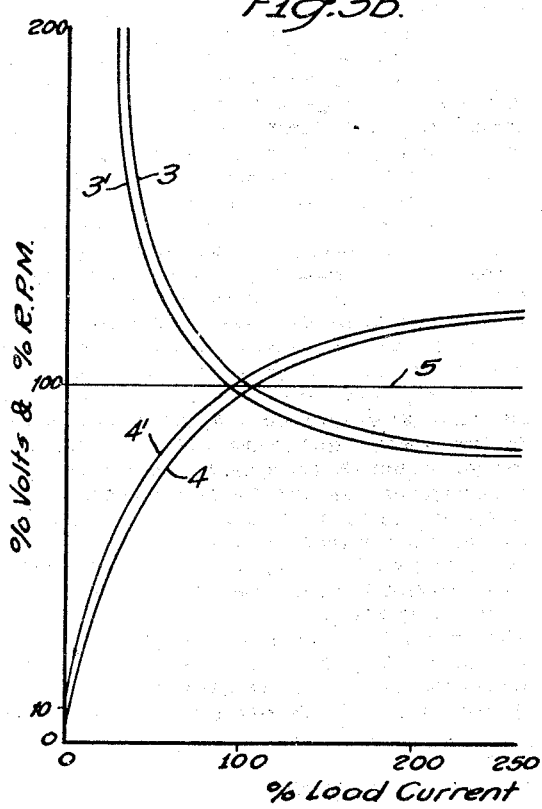
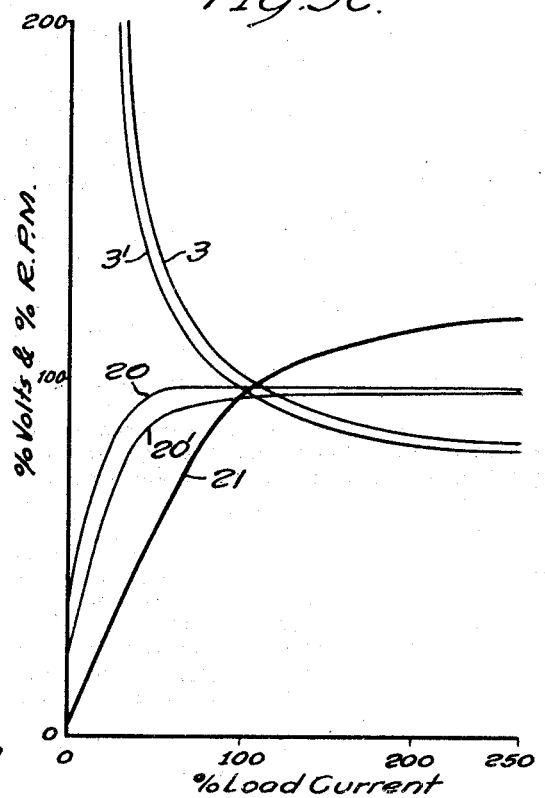
INVENTORS
William R. Harding &
Scott H. Hanville.
BY
Paul E. Friedmann
ATTORNEY Dec. 1, 1942.  W. R. HARDING ET AL  2,303,457
SERIES SPEED-CONTROL UNITS
Filed Oct. 19, 1940  4 Sheets-Sheet 4
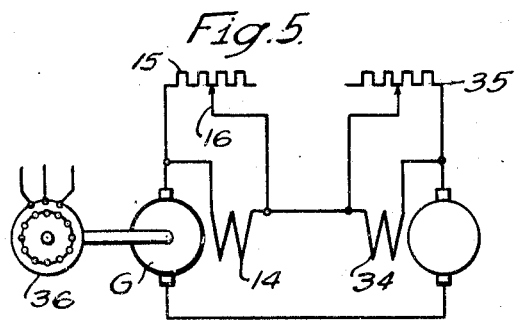
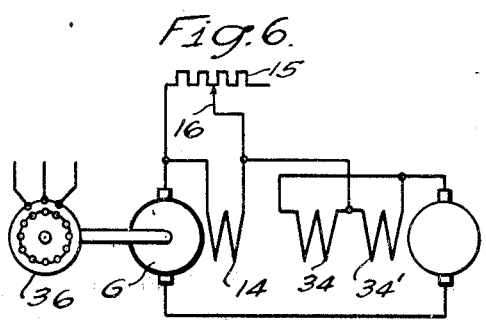
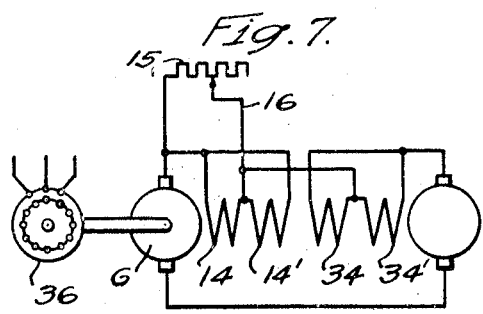
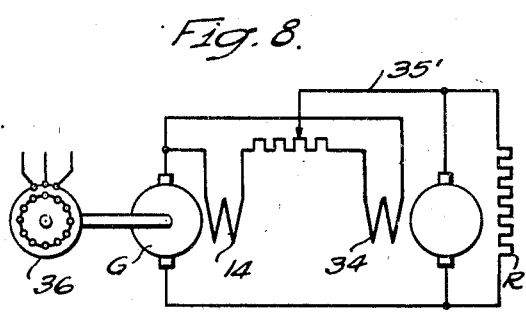
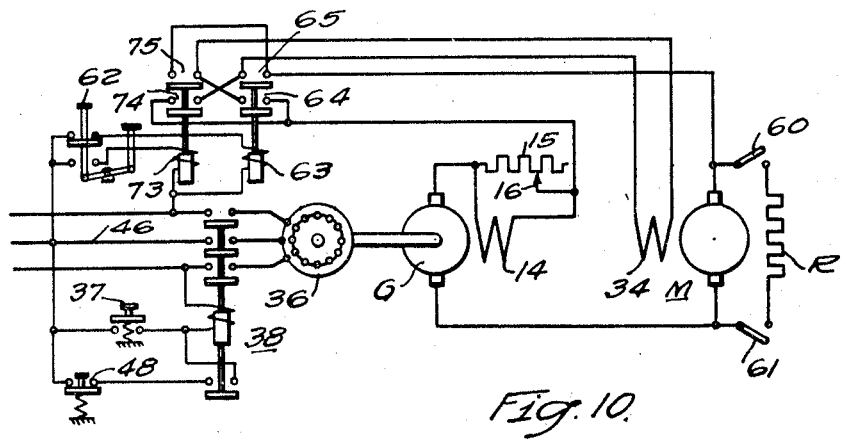
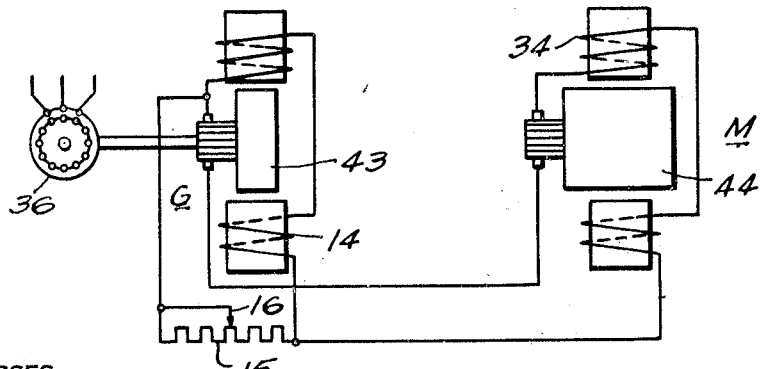
WITNESSES:
INVENTORS
William R. Harding &
Scott H. Hanville.
BY
Paul E. Friedemann
ATTORNEY Patented Dec. 1, 1942

2,303,457

UNITED STATES PATENT OFFICE 2,303,457

SERIES SPEED-CONTROL UNITS

William R. Harding, Murrysville, and Scott H. Hanville, Oakmont, Pa., assignors to Westinghouse Electric & Manufacturing Company, East Pittsburgh, Pa., a corporation of Pennsylvania Application October 19, 1940, Serial No. 361,934

11 Claims. (Cl. 172—239)

Our invention relates to adjustable speed drives, and more particularly to a variable voltage generator and motor drive in which the generator is a series generator and the motor is also of the series type having the same frame size, and thus a rating equal to that of the generator.

Series motors are, of course, in regular use and well known to the trade, but series generators have always been held very unsatisfactory. For instance, as one of their disadvantages, such generators have a rising voltage characteristic with an increase in load current. This is usually very unsatisfactory, however, by selecting the proper values for the constants of both the generator and the motor, the motor speed may be kept substantially constant for any speed setting selected regardless of the variations in load.

One broad object of our invention is to provide for substantially constant speed of a series motor energized from a series generator for all speeds selected for the motor regardless of variations in load on the motor.

Another object of our invention is to provide for stable high torque operation of a series motor at low speed.

A still further object of our invention as hereinafter disclosed is to provide for good speed regulation at light loads.

It is also an object to provide in a variable voltage drive a series generator having negligible residual flux.

One object of our invention is to provide in a variable voltage drive a series generator and a series motor in which both have very low residual magnetism.

It is also an object of our invention to provide for a wide range of stable speeds for a variable voltage drive utilizing a series motor connected to a series generator.

The objects hereinbefore expressed are believed to be merely illustrative and many other objects and advantages will become more apparent from a study of the following specification when considered with the drawings accompanying the specification, and in which drawings:

Figs. 3, 3a, 3b, 3c, 3d, 3e, 3f and 3g show a plurality of curves helpful in illustrating some of the characteristics of our drive;

Figs. 5, 6, 7, 8, 9 and 10 are diagrammatic showings of modifications of the fundamental scheme shown in Fig. 4.

Figure 1:
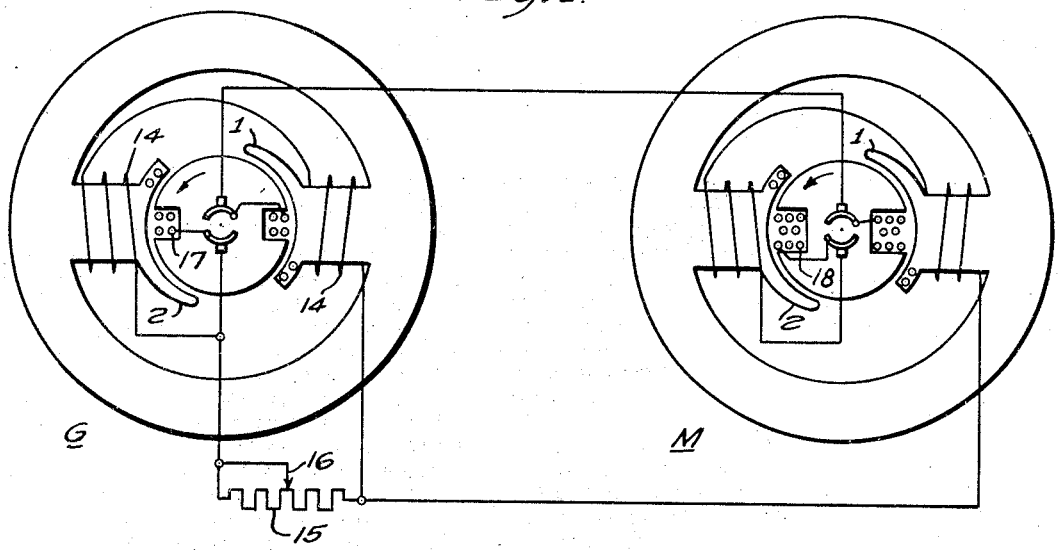
Figure 1 is a diagrammatic showing of our invention and in one comprehensive view shows schematically most of the contributions we have made to the art.
Figure 4:
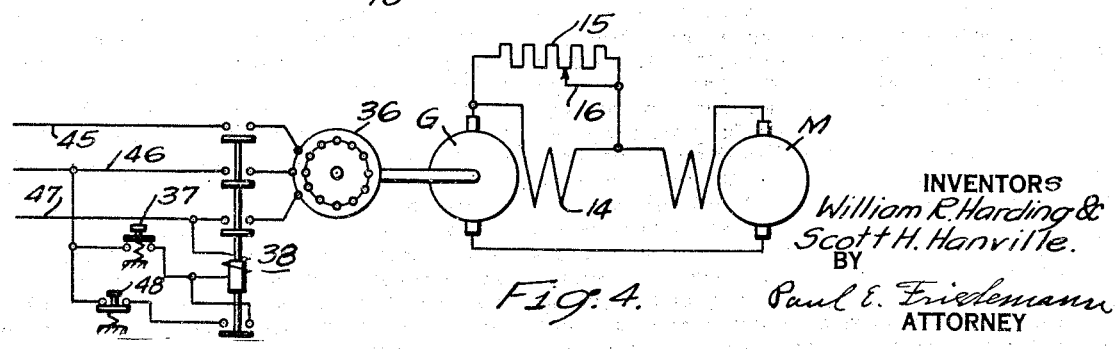
Fig. 4 shows our drive in its simplest diagrammatic form.

In Fig. 1, G designates a series generator and M designates a series motor. The two dynamo electric machines are preferably of the same frame size, and thus of comparable rating, and are otherwise exactly alike in structure. The generator G is driven by a suitable constant speed alternating current motor (not shown in Fig. 1) coupled to a source of alternating current in the same manner as indicated in Fig. 4.

The generator and motor may have any number of pairs of poles but we have selected two pole machines for simplicity. The pole pieces are provided with trailing pole tips 1 and 2 and the leading tips are cut off as indicated. The leading tips may even have holes drilled therethrough. This type of pole construction reduces the no-load flux without materially altering the full-load flux. This helps improve the regulation at the lower loads. When a conventional series system is used the speed regulation is very poor, and this is especially pronounced at the light loads. By making the pole construction as shown the low load flux is decreased thus improving the speed regulation at the low loads.

To further improve the speed regulation, particularly at the light loads, our theoretical considerations shows that this could be accomplished if machines could be had that show no, or zero, hysteresis losses and yet were able to build up flux to produce voltage and torque on the generator and motor, respectively. Dynamoelectric machines having no hysteresis loses are, neither possible nor desirable because such machine would not build up flux.

This, however, does not mean very material improvements cannot be obtained with existing materials. For instance, laminated roll steel and Bessemer sheet steel and other irons and steels are extensively used for dynamo-electric machines because of their quality of low residual. The known materials as new used and supplied to the trade are, however, at times not good enough for our aims. We, therefore, use these known materials and, if necessary, which is usually the case, anneal the machine structure to reduce the residual flux to the desired value.

In Fig. 3b curves 3 and 3' show a speed load curve of a conventional series motor having normal residual, whereas curves 4 and 4' show the saturation curve of a series generator of exactly the same design and rating as the motor and also having normal residual. The speed regulation curve 5 is thus a straight line, disregarding IR losses and some other losses.

If the generator as shown by curve 21 in Fig. 3c, is provided with low residual, then the speed regulation curve is as indicated by curves 20, 20'.

This can be verified by multiplying the percent voltage, taken from curve 21 at a given percent load, by the percent speed, taken from curves 3 and 3' for the same given percent load.

Figure 3D:
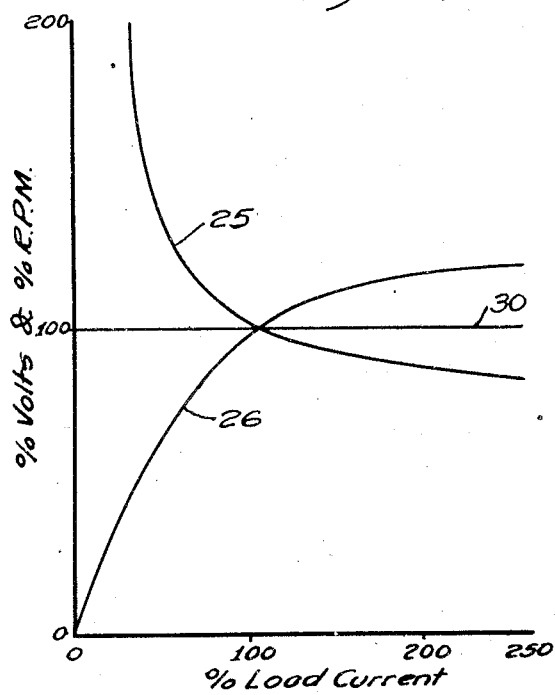

If both machines, which are otherwise exactly alike in design, are also provided with low residual, as shown by curves 25 and 26 in Fig. 3d, then the speed regulation, as shown by curve 30, will also be constant.

Figure 3E:
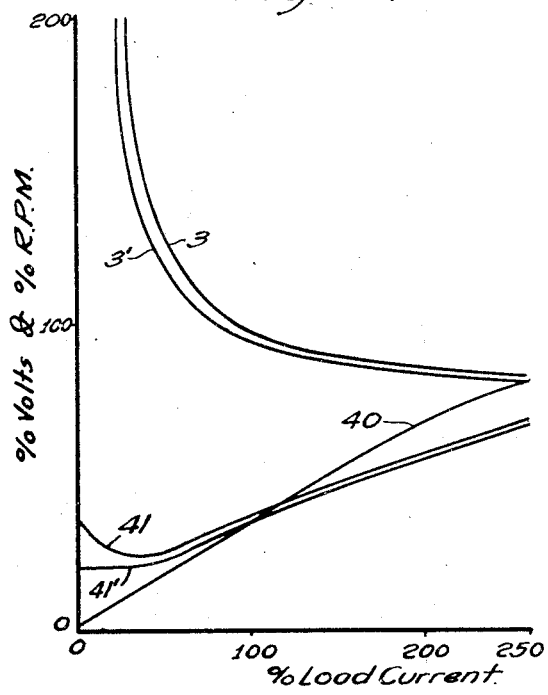
Figure 3F:
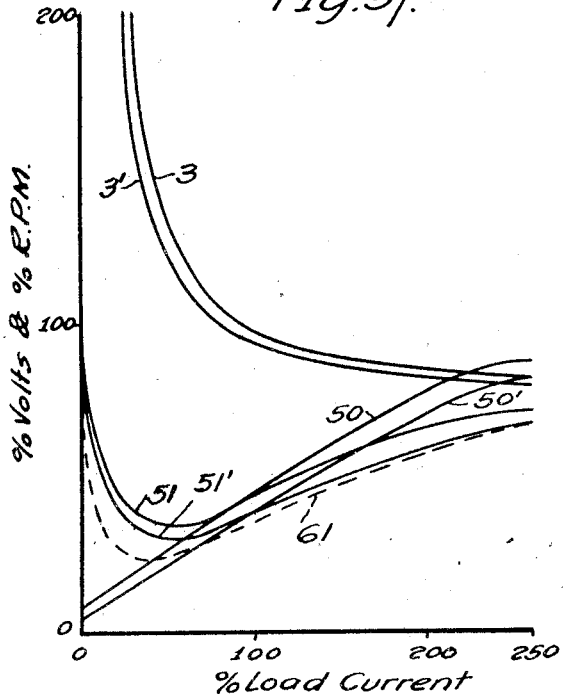

Fig. 3f shows the curves for voltage, curves 50 and 50' and speed regulation curves 51 and 51' for a conventional series motor and series generator operating at, say, 25% full field on the generator. It will be noted that the regulation is poor at the low loads.

Of course one of the aims of our invention is to improve the regulation at low speed and low load. The voltage curve of a generator of low residual for say 25% field on the generator will be as indicated by curve 40 of Fig. 3e. By calculating for the speed regulation in relation to the curve of a conventional high residual motor, the curves 41 and 41' are obtained. These curves 41 and 41' seem to show the very best speed regulation that can be obtained. On test, however, the stability of the system was found to fall somewhat short of what is desirable.

Figure 3G:
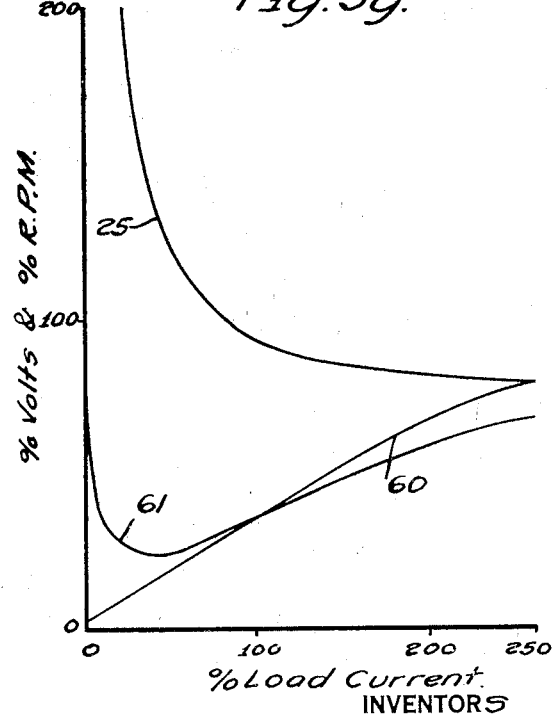

In Fig. 3g the calculated curves are shown for two like machines of low residual. The voltage curve is indicated by 60. By multiplying the percent voltage on this curve 60, for a selected percent load current, by the percent speed on curve 25 for the same selected percent load current, the motor speed may be obtained. In this manner the speed regulation curve 61 is obtained. By comparing this calculated curve 61 with the calculated curves 51 and 51', it will be noted that much better regulation is obtained at low loads. This is borne out by the curves showing actual test curves for like machines of low residual.

Some actual speed regulation curves are shown in Fig. 3a for three different speed settings. The curves 8, 9 and 10 show the regulation for three speed settings for machines having a low residual and curves 11, 12 and 13 show the regulation of conventional series machines connected in a series system. While the holes and "cut-offs" of the leading tips are of help the main and principal improvement is obtained from the annealing of the frame.

The generator G has the series field 14 provided with the shunting rheostat 15. By shifting the lead 16 various motor speeds may be selected.

The armature windings of the motor and generator are actually in practice not constructed as indicated but the showing does clarify and simplify the disclosure of one of our further improvements. The generator armature is shown with four bar turns 17 while the motor armature is shown with eight bar turns 18. This means, though the two machines are in most every other respect alike, that the generator is wound for only near half the voltage for which the motor is wound.

This difference in armature resistance constants means that we may obtain much higher and more stable torques from the motor at low speed settings. If the generator armature had the same number of bar turns, then the IR losses would be indicated by curve 20 (see Fig. 3). For a speed setting indicated by the saturation curve 21, the maximum current that can be forced through the motor is 7.6 amperes. A given torque is thus obtained. Now if the resistance losses are changed to a value as indicated by curve 22 then the current that can be forced through the motor is 12.3 amperes. A much higher torque is thus obtained and this is true particularly for the low speeds.

The other curves on Fig. 3 merely indicate voltage curves for various settings and the shaded portion 23 indicates how much less hysteresis effect there is in a machine having low residual.

From the curves shown in Figs. 3, 3a, to 3g, inclusive, it is apparent that normal high residual flux is in the neighborhood of 20% of the no-load saturation flux and will rarely be below 15% of the no-load saturation flux. Low residual, as is clear from the curves, means a residual flux ranging from 4% to 15% of the no-load saturation flux.

In Figs. 1, 2, 4, 6, 7 and 9 no rheostatic control is shown for the series motor and ordinarily none is needed. If, however, further speed and torque control is desired the motor series field 34 may also be provided with rheostatic control 35 or 35' as shown in Figs. 5 and 8.

The most important contribution we have made is the provision of low residual magnetism machines in the variable voltage series circuit system shown. The other contributions are, however, also important. In Figs. 4, 7, 8 and 9 the armatures of the two machines are shown alike by the like weight of the armature indication. In Figs. 5 and 6 the low generator armature resistance is shown by the heavy character of the generator armature indication.

Where the equipment is started, as indicated by the first method, with the alternating current motor at its running speed and by closing a contactor in the loop circuit of motor M and generator G, the starting of the motor M is very violent and unsuitable for machine tool applications.

The starting detail, according to the second method, may be effected by operating the starting push button 37 which effects the operation of the line contactor 38 to thus connect the main alternating current motor 36 to the alternating current supply buses 45, 46 and 47. To stop the system, the push-button switch 48 is operated.

It will be noted that with this second method of starting, the loop circuit including the generator G and the motor M constitutes a fixed circuit requiring no electrical contactors and thus not only provides a smooth starting for the motor M as has already been pointed out, but, in addition, provides a starting control of the simplest, cheapest and most reliable arrangement for a machine tool drive as herein disclosed.

For some applications the motor field windings as 34 and 34' may be connected in parallel, as shown in Figs. 6 and 7. For still other applications the generator fields may also be connected in parallel as shown in Fig. 7.

The advantages of a low resistance generator, that is, a generator wound for lower voltage than the motor, may also be obtained by making the armature core 43 of the generator G shorter than the armature core 44 of the motor M and providing them with the same number of bar turns or even different number of bar turns. This is illustrated in Fig. 10. For some applications it was found desirable to use a resistance load R in parallel with the motor armature. Note Figs. 8 and 9.

In starting motor M we have used two methods. By one method we start the alternating current motor 36 and bring it up to full speed while at the same time lead 16 is set for minimum field shunting resistance. The lead 16 is then slowly moved to increase the field shunting resistance to thus increase the field excitation to thus speed up the motor. In doing this we pass through a series of voltage curves such as shown in Fig. 3.

By our preferred method of starting motor M, lead 16 is placed at the desired final speed setting. The alternating current motor 36 is then connected to the alternating current supply. The voltage of generator G is very low at the initial low speeds of motor 36 and increases gradually as the speed of the alternating current motor increases. When motor M, a little later in point of time, begins to rotate, more load is put on motor 36 to thus tend to slow it down. This, thus gives a very smooth acceleration for motor M.

In Fig. 9, if the switches 60 and 61 are in open position as shown so as to eliminate the load resistor R, the control is as shown in Fig. 4, but with a reversing control added.

To start this system lead 16 is positioned on resistor 15 for a given or desired speed setting. Push button switch 62 is then actuated to select the direction of rotation desired. If this switch 62 is actuated to the position shown then a circuit is established from bus 46 through switch 62, actuating coil 63 to bus 45. Contact members 64 and 65 are thus closed so that the field 34 is connected for the desired direction of rotation. This circuit may be traced from the lower, let us say, positive, generator terminal to generator G through the armature of motor M, contact members 65, field winding 34 from left to right, contact members 64, field 14 to the upper or negative terminal of the generator G.

When switches 37 and 38 are caused to operate the motor M will be accelerated gradually in the desired direction.

If reversing is to be effected, switch 62 is operated so as to energize coil 73 to thus effect closing of contact members 74 and 75.

The field 34 is thus reversed, that is the motor M is plugged. In a fairly short time the motor M will thus reverse.

Figure 2:
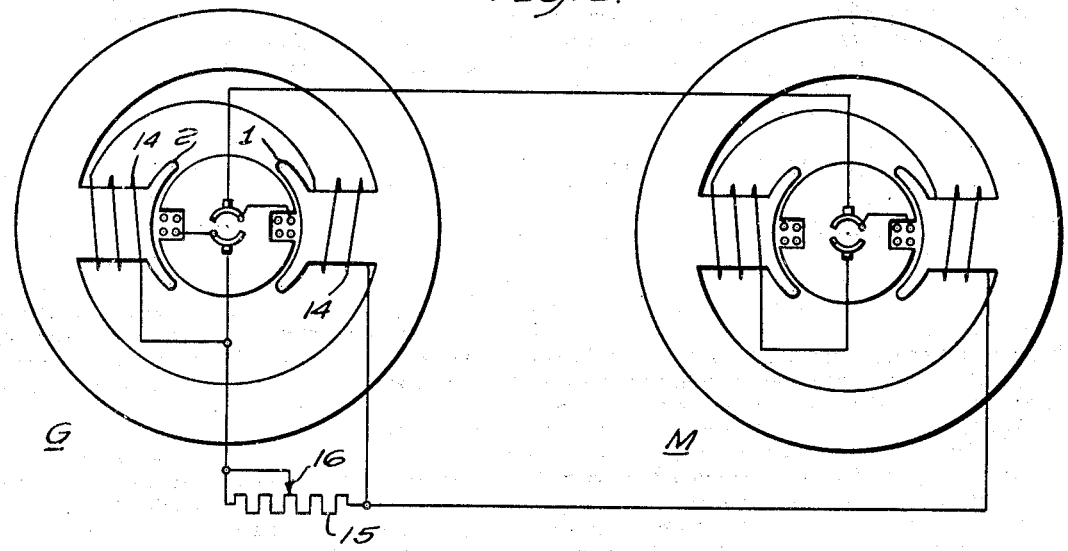
Fig. 2 is similar to Fig. 1 but does not show the special pole structure nor the difference in armature structure between the generator and motor.

While we have shown a considerable number of embodiments of our invention, the fundamental circuit in combination with an annealed frame is shown in Figs. 1, 2 and 4. The other circuits all include the fundamental idea.

We are aware that others particularly after having had the benefit of our teaching may devise still further circuits and other similar features. We, therefore, do not wish to be limited to the specific showing made but wish to be limited only by the scope of the claims hereto appended.

We claim as our invention:

1. In a motor drive circuit, in combination, a series generator coupled to motor means to be driven at substantially constant speed, a series motor connected to the generator to be electrically drive thereby, said motor and generator having magnetic circuits so treated that each machine has low residual magnetism relative to its normal residual magnetism, an adjustable resistor shunting the series field of the generator only, said generator and motor otherwise being alike in every respect as in the design, and size so as to have like mechanical, magnetic and electrical characteristics, except that the generator has fewer winding turns in its armature winding than the motor.

2. In a motor drive circuit, in combination, a series generator coupled to motor means to be driven at substantially constant speed, a series motor connected to the generator to be electrically driven thereby, said motor and generator having magnetic circuits each so treated that each machine has low residual magnetism relative to its normal residual magnetism, an adjustable resistor shunting the series field of the generator only, said generator and motor otherwise being alike in every respect as in the design, and size so as to have like mechanical magnetic and electrical characteristics except that the generator armature is built for lower voltage than the motor armature.

3. In a motor drive circuit, in combination, a series generator having an armature winding of a given relatively low resistance value, a series type field winding connected in series with the armature, an adjustable resistor connected in shunt relation to the field winding to thus adjust the excitation thereof, the generator having a magnetic circuit treated to have low residual magnetism relative to its normal residual magnetism, a series motor connected to the series generator, said series motor having an armature winding of a given resistance value higher than the said resistance value of the generator, a series type field winding connected in series with the armature winding, the motor having a magnetic circuit also treated to have low residual magnetism relative to its normal residual magnetism, said generator and motor each having pole pieces for the respective field windings whose trailing tips are substantially conventional whereas the leading tips are changed in structure to have a relatively high reluctance.

4. In a system of control for a series direct-current motor, in combination, a series direct-current motor having a magnetic circuit treated to have low residual magnetism relative to its normal residual magnetism and having an armature built for a given voltage, a series direct-current generator also having a magnetic circuit treated to have low residual magnetism relative to its normal residual magnetism, an armature built for a lower voltage than the armature of the motor, said armatures being connected in a loop circuit, and a series field winding provided with an adjustable resistance resistor in shunt relation to the generator series field winding, said generator being, other than hereinbefore mentioned, designed to have the same characteristics as the motor, and means for driving the generator.

5. In a system of control for a series motor, in combination, a series generator having an annealed magnetic circuit to thus have a low residual magnetism relative to its normal residual magnetism, an armature structure and winding of a given capacity, a series field, means for varying the excitation of the series field, pole pieces for the field windings so constructed as to have a relatively low no-load flux, a series motor similar in every respect to the generator except that the armature structure and winding is selected to have a greater capacity than the generator armature structure and winding and no means are provided other than the voltage from the generator to vary the field excitation, said motor and generator armature windings being connected in a loop circuit.

6. In a system of control for a series motor, in combination, a series generator having an annealed magnetic circuit to thus have a low residual magnetism relative to its normal residual magnetism before annealing, an armature structure of a given capacity, and a series field winding, means for varying the excitation of the series field winding, pole pieces for the field windings so constructed as to have a relatively low no-load flux, a series motor, connected in series with the series generator, similar in size and other respects except that the motor residual magnetism is not below its normal and that the armature structure is selected to have a greater capacity than the generator armature structure and that no means are provided, other than the voltage from the generator, to vary the field excitation.

7. In a system of control for a series motor, in combination, a series generator having an annealed magnetic circuit to thus have a residual flux less than 10% of the flux at no load saturation, an armature structure and winding of a given capacity, a series field winding, means for varying the excitation of the series field winding, pole pieces for the series field windings so constructed as to have a relatively low no load flux, a series motor similar in every respect to the generator except that its magnetic circuit is conventional and except that the armature structure and winding are designed to have a greater capacity than the generator armature structure and winding, and no means are provided, other than from the voltage variation of the generator, to vary the motor field excitation, said armature windings of the motor and generator being connected in a loop circuit.

8. In a variable speed drive, in combination, a dynamo-electric machine comprising a series generator mechanically coupled to motor means to thus generate electric energy, a second dynamo-electric machine comprising a series motor electrically connected to the generator to be electrically driven thereby, one of said machines having a magnetic circuit so treated that its flux due to residual magnetism is less than 14% of the no load saturation flux of the machine, and means for varying the excitation current of the generator to thus vary the speed of the motor.

9. In a variable speed drive, in combination, a machine comprising a series generator coupled to motor means to be driven at a substantially constant speed, a second machine comprising a series motor electrically connected to the generator to be electrically driven thereby, one of said machines having a magnetic circuit so treated that its flux due to residual magnetism may be anywhere from 4% to 15% of the no load saturation flux of the machine, an adjustable resistor shunting the series field of the generator only, said two machines, except for the qualifications above recited for one of the machines, being alike in every respect as to size and design so as to have substantially like mechanical and similar electrical characteristics.

10. In a variable speed drive, in combination, a series generator coupled to motor means to be driven at substantially constant speed, a series motor electrically connected to the generator to be electrically driven thereby, said generator having a magnetic circuit so treated that the generator has a low residual magnetism that falls within the range of 4% to 15% of the no-load saturation flux of the generator, an adjustable resistor shunting the series field of the generator only, said generator and motor otherwise being alike in every respect as to size and design so as to have substantially like mechanical and electrical characteristics.

11. In a variable speed drive, in combination, a dynamo-electric machine comprising a series generator mechanically coupled to motor means to thus generate electric energy, adjustable impedance means connected in parallel relation to the series field of the generator to thus vary the voltage of the energy generated by said generator, a second dynamo-electric machine comprising a series motor electrically connected to the generator to be thus electrically driven at variable speeds by said generator, the motor speed being a function of the adjustment of the adjustable impedance for the generator series field winding, one of said machines having a magnetic circuit so treated that its flux due to residual magnetism is anywhere from 4% to 15% of the no-load saturation flux of the machine, whereby good speed regulation is obtained.

WILLIAM R. HARDING.
SCOTT H. HANVILLE.